(No Model.) 3 Sheets—Sheet 1.
J. P. MARTIN.
APPARATUS FOR MILKING COWS.
No. 289,546. Patented Dec. 4, 1883.
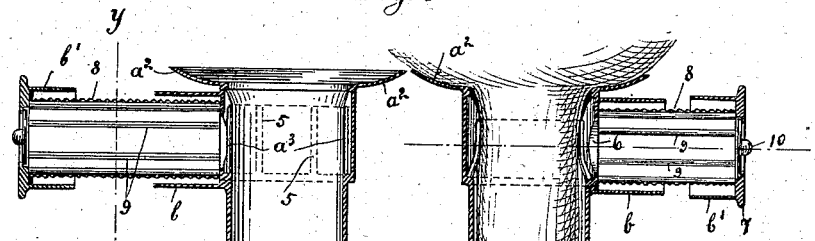
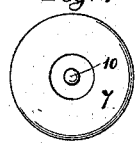
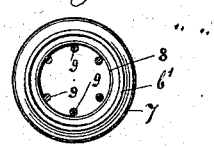
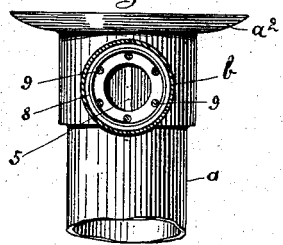
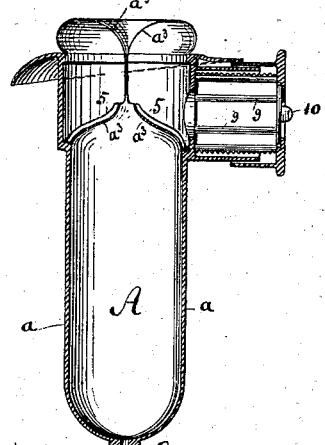
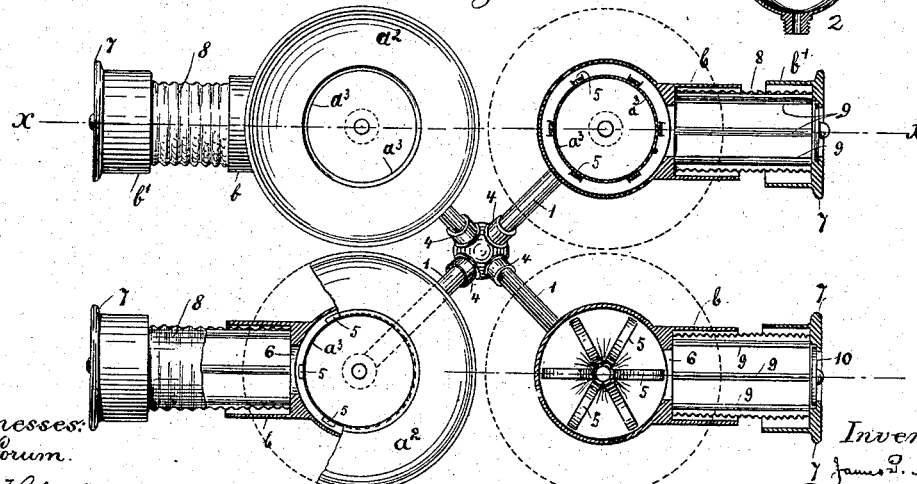

(No Model.) 3 Sheets—Sheet 2.
J. P. MARTIN.
APPARATUS FOR MILKING COWS.
No. 289,546. Patented Dec. 4, 1883.
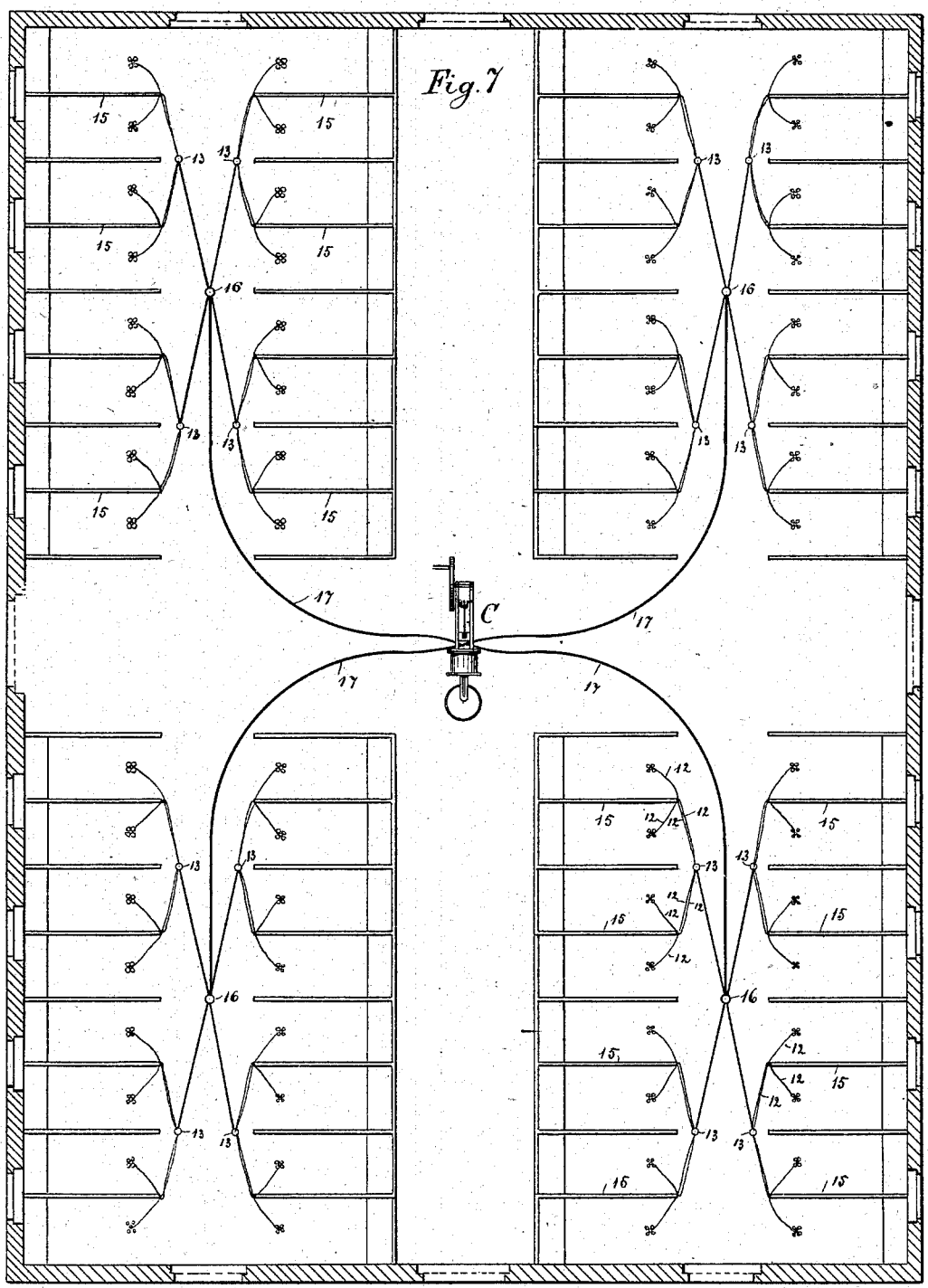

(No Model.) 3 Sheets—Sheet 3.
J. P. MARTIN.
APPARATUS FOR MILKING COWS.
No. 289,546. Patented Dec. 4, 1883.
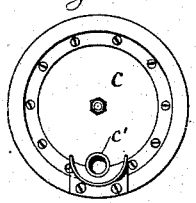
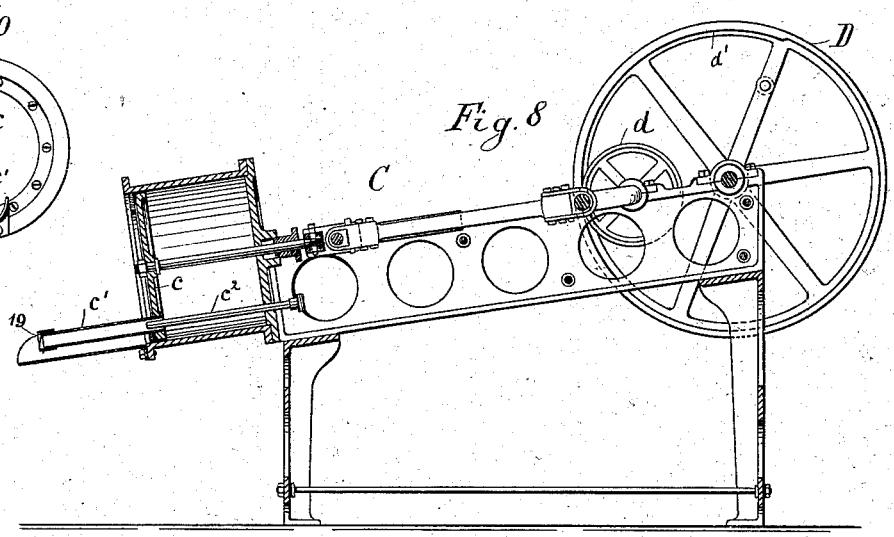
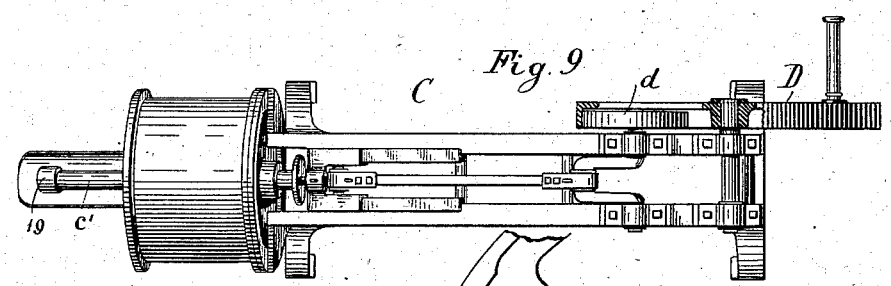
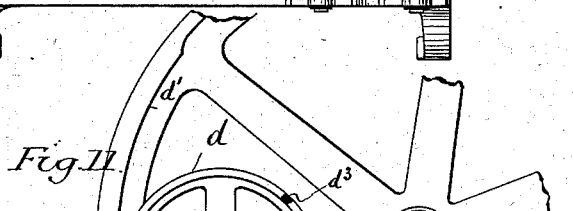
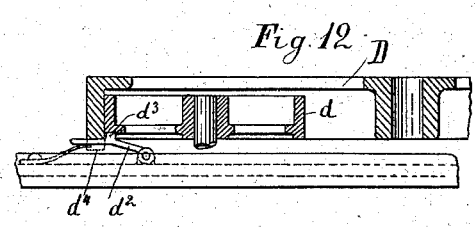
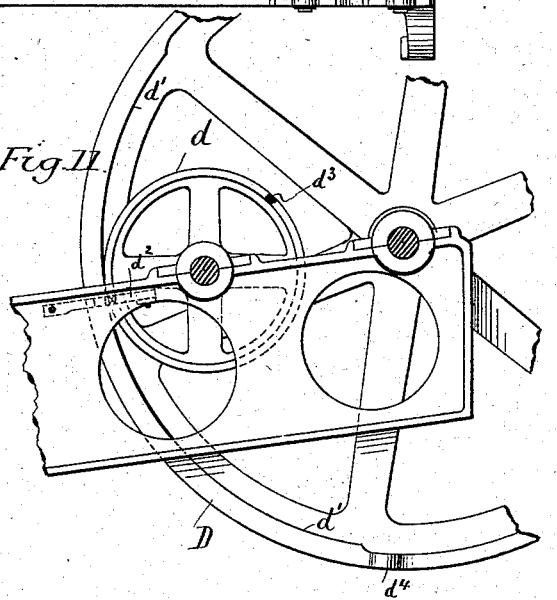
Witnesses.
J. Lorum.
L. Holmboe.
Inventor:
James P. Martin
By Price Fisher
His Attorneys.

United States Patent Office.

JAMES P. MARTIN, OF ST. PAUL, MINNESOTA.

APPARATUS FOR MILKING COWS.

SPECIFICATION forming part of Letters Patent No. 289,546, dated December 4, 1883.

Application filed June 18, 1883. (No model.)

*To all whom it may concern:*

Be it known that I, JAMES P. MARTIN, a citizen of the United States, residing at St. Paul, in the county of Ramsey and State of Minnesota, have invented certain new and useful Improvements in Apparatus for Milking Cows; and I do hereby declare the following to be a full, clear, and exact description thereof, sufficient to enable others skilled in the art to make and use the same.

The present invention, which I distinguish by the trade-name "Multisorb," is designed, primarily, to effect the mechanical milking of a number of cows simultaneously, there being a single exhaust device in communication with the several sets of apparatus applied to the individual cows, so that the vacuum produced thereby extends to each set of teat-covers alike, and effects an even, easy, and rapid withdrawal of the milk in manner entirely under control of the operator located at the exhaust-pump. The invention may be readily employed in connection with any number of cows, regard being had to the capacity of the vacuum-pump, or, indeed, may be used for one cow alone, if necessary, though its great economy lies in its applicability to the milking of a large number of cows at a single setting of the various parts.

The precise nature of the invention will clearly appear from the following description, and be thereafter more distinctly defined by the summary of claims made.

Referring to the accompanying drawings, in which like letters of reference indicate like parts, Figure 1 is a longitudinal vertical section, on line $x\ x$ of Fig. 2, through two of a set of four teat-covers designed for application to a single cow. Fig. 2 is a plan view of four teat-covers and their adjuncts, the whole constituting a set for a single cow. Fig. 3 is a longitudinal sectional view of a single teat-cover detached, the pressure-case thereof being collapsed to illustrate the "ballooning" of the diaphragm. Fig. 4 is a front view of the cap of the pressure-case thimble. Figs. 5 and 6 are views in section on line $y\ y$, Fig. 1, looking to the left and to the right, respectively. Fig. 7 is a plan view of the general arrangement of milking-stalls for sixty-four cows, and of the disposition of the same and of the milking appliances with reference to the exhaust-pump. Fig. 8 is a longitudinal section, and Fig. 9 a top plan view, (parts being in section,) of the air-pump for exhausting the teat-cover. Fig. 10 is a view in elevation of the front of the pump-cylinder. Fig. 11 is a detail view in side elevation, and Fig. 12 a cross-section view, of the driving mechanism to operate the air-pump.

Four teat-covers, constituting a set, to be applied to the teats of a single cow, are arranged as represented in Figs. 1 and 2. The flexible pipes 1, screwed to the threaded ducts 2 at the bottom of each vacuum-chamber A of the set of covers, lead thence to an accumulating-bulb, 3, into which the pipes discharge in common, they being joined to said bulb through the intermediate threaded couplings, 4. Such being the general disposition of the several teat-covers constituting a set, it will be merely necessary to describe the construction in detail of one of them, because said covers are precisely alike in all essentials.

The cylindric casing $a$ of the vacuum-chamber A is made preferably of hard rubber, vulcanite, celluloid, or the like material, to better insure necessary strength with lightness. Said casing is of adequate diameter to easily admit within it a teat of usual size when distended, and has at its mouth a flaring rim, $a^2$, secured thereto, which rim is preferably semi-flexible, being made of ordinary nipple-shield or like material. An offset or shoulder is formed in the upper portion of casing $a$, to the upper and lower ledges whereof are fastened, in air-tight fashion, the edges of a short cylindrical diaphragm, $a^3$, said diaphragm being made of flexible impervious material—such as sheet-rubber or the like—and about its lower part having fastened thereto the vertical stay-splints 5. These splints may be of whalebone, steel, or the like, though preferably they are of vulcanized rubber with a backing of vulcanite, as in the well-known "artist's and book-keeper's flexible ruler." Being secured to the diaphragm $a^3$, the splints 5 serve to stiffen the same, though as they do not extend its entire length the upper zone thereof retains its original flexibility. The lower part of the diaphragm may be re-enforced or made somewhat thicker in substance than the upper portion, to still further promote comparative rigidity thereof, which the splints 5 are designed to effect.

Diaphragm $a^3$, in connection with the walls of the offset of casing $a$, forms an air-chamber closed at all parts save for orifice 6 in the casing, which opens thence into an outer cylindrical pressure-case. The body portion $b$ of this case and the thimble $b'$, fitting snugly over it, are of like material with casing $a$, to which, indeed, said body portion is joined or of which it may be part. Connected to the cap 7 of the thimble $b'$ and to the casing $a$ at the base of pressure-case is a cylinder, 8, of some suitable impervious nonelastic material, adapted to be received and collapsed within said thimble $b'$ and the body $b$ of the pressure-case. Strands of rubber cord or the like, as at 9, are contained between and about the layers of material composing the collapsible cylinder 8, which strands are of normal length when said cylinder is collapsed and the thimble $b'$ is upon the body $b$, as in Fig. 3, but are stretched when these parts are distended, as in Figs. 1 and 2. When the pressure-case is elongated, it is plain that the tension of said strands 9 tends to collapse the cylinder 8 and to draw thimble $b'$ to its seat. Within a suitable recess in cap 7 rests the valve 10, opening inward. The valve closes an orifice in said cap and admits air to the interior of the pressure-case, but prevents the exit thereof, save when the button on said valve is pressed to force the valve away from its seat.

To each bulb 3 of an individual set of teat-covers a suction-tube, 12, is screwed, the opposite end of which tube is joined in like manner to a similar bulb, 13, of about four times the capacity of the smaller bulb 3. The bulb 13, Fig. 7, is connected up by four suction-tubes, 12, so as to receive the contents of as many individual bulbs 3, and it will be noticed from plan view, Fig. 7, that said collecting-bulbs 13 are located with respect to the stalls and to the individual sets of teat-covers in such wise that each of said sets, or, rather, its bulb 3, is joined to the collecting-bulb 13 by the same length of suction-tube, 12, with its fellows. The tubing for adjoining stalls may be held by suitable supports set in alternate partitions 15, whereby the weight of the tubing is relieved and the apparatus kept from being trampled under foot. In like manner with the foregoing the collecting-bulbs 13, in sets of four each, are joined by tubing of equal length to what may be termed a "section-bulb," 16, of like construction therewith, said bulb being adapted to receive the contents of an entire section, or, as represented in drawings, the milk from sixteen cows. Section-bulbs 16 are each located at equal distance from the exhaust-pump C, to which they are joined by suitable tubing, 17. From this disposition of the individual sets of teat-covers in sections and subsections symmetrically arranged with reference to the common exhaust mechanism, and joined by tubing and bulbs, which for like position are of like capacity, it is obvious that the influence of said exhaust is felt evenly and equally by each separate set, no matter what may be its comparative distance from the center. All tubing should be linen-lined (preferably) to allow of easy cleansing, and wherever joined to the bulbs or teat-covers should have rubber washers or like packing to make air-tight joints.

For effecting the necessary vacuum there is provided an air-pump, C, mounted in a suitable frame, which may also sustain the driving-wheels D $d$, to reciprocate the piston of the pump. The cylinder of pump C is open at the front end, but closed at the back, while the piston-head $c$ of said pump works air-tight therein by reason of the usual packing or gasket secured to its rim. A pipe, $c'$, projecting from the piston-head, to which it is attached, has its external orifice closed by an outwardly-opening clapper or like valve, 19, while the inner end of said pipe communicates directly with the interior of the pump-cylinder. Secured to the back end of the cylinder is another pipe, $c^2$, open at both ends, and of somewhat smaller diameter than the pipe $c'$, into which the forward portion of said pipe $c^2$ extends, and by which it is still further inclosed when the backward stroke of the piston brings the piston-head $c$ within the pump-cylinder. The piston-rod, stuffing-box, cross-head ways, and connecting-rod are of ordinary construction. The driving-wheel $d$, to the crank of which the connecting-rod of the pump is joined, is mounted in its frame in such wise as to bear in friction contact with its outer rim against a raised portion, $d'$, of the inner rim of the main driver D. This raised portion is exactly equal to the circumference of wheel $d$, and constitutes, as will be noted, about one-third the circumference of the main driver D.

A spring-catch, $d^2$, pivoted to the frame, engages a notch or recess, $d^3$, inside of wheel $d$, and holds said wheel stationary during revolution of main driver D, save when the raised portion $d'$ in course is about to contact with the rim of wheel $d$. At this juncture a lug, $d^4$, on the main driver D trips the pivoted catch $d^2$, throwing it from notch $d^3$, and permitting the wheel $d$ to perform one complete revolution by reason of frictional contact with the raised rim before the catch can drop into the notch and lock said wheel again. When the driving-wheel $d$ describes its first half-revolution, it draws the piston back within the cylinder, expelling the contained air, which escapes thence through the annular space between pipes $c'$ $c^2$ into said pipe $c'$, lifting valve 19 at its end, and discharging into the atmosphere. The contents of the cylinder are entirely expelled at the end of the backward stroke of the piston, which, immediately thereafter, during the second half-revolution of the wheel, makes its full stroke forward, sucking the air from the tubes and bulbs of the system of teat-covers connected up with pipe $c^2$, and establishing a partial vacuum therein, the tendency whereof is to draw the milk from the cows to which the teat-cover sets are attached. The special operation of the teat-covers in effecting this object will be considered hereinafter, the purpose now being merely to direct attention to the fact that one complete revolution of the small driving-wheel $d$ effects a quick back-and-forth reciprocation of the piston of the pump, which operates first to destroy and immediately thereafter to restore a vacuum in the system of milking appliances, this restoration of the vacuum being followed by a period of rest, during which the main driver is describing two-thirds of its revolution; or, otherwise stated, the air or milk collected in the cylinder of the pump is being expelled during one-sixth of the circuit of the main driver D, the vacuum is being created during the succeeding one-sixth, while for the remaining four-sixths of its revolution the pump and its adjuncts are quiescent at the point of highest rarefaction under conditions most favorable to the expulsion of milk from the udders, and to the accumulation thereof in the various parts located between the teat-covers and the pump-cylinder. It is deemed that the best results ensue when the capacity of the pump with reference to the system of milking appliances connected thereto is as four to one, so that the exhaust is at about one-fourth of an atmosphere.

In the drawings, Fig. 7, the exhaust-pump is shown in position to be attached in turn to each one of the connecting-pipes 17 pertaining to a section of sixteen stalls. By this arrangement sixty-four cows may be at one time in the stalls of the milking-shed, and while the first section of sixteen cows is being milked the second section is in preparation therefor, and so for the third and fourth. The time necessary to effect the milking of the entire number of sixty-four cows is about the same as would be consumed in milking two cows by hand. It is obvious that by multiplying the number of stalls, and at the same time preserving the relative position of the exhaust-pump with respect to the various sections of stalls, so that the evenness of vacuum in the several individual teat-covers may be insured, as heretofore explained, an increase in capacity of the pump will enable a correspondingly larger number of cows than herein detailed to be milked at one setting of the parts; or, reversely, the pump may be stationed at the section-bulbs 16, or, again, at the collecting-bulbs 13, if the capacity of the pump be small and the cows to be milked be but few in number.

If for any reason a full complement of cows for the section cannot be had, so that there are vacant stalls at the time the section is in communication with the air-pump, then, in order to prevent an undue exhaust action upon the lesser number of cows while being milked, it is preferred to have a series of bottles with threaded necks capable of being screwed to flexible pipes 1, in lieu of the teat-covers A, each of said bottles to have a cubical capacity about equal to that of a single teat-cover when an average-sized teat is inclosed. By this means each bottle contributes its quota of air to the exhaust-pump precisely as the teat-cover would do, thus relieving the lesser number of cows from any excessive vacuum which, save for this precaution, might be developed. The teat-cover being slipped over the teat until the rim $a^2$ thereof bears snugly against the udder, the pressure-case is distended to its full length, and then released. While the case is being drawn out, the air enters freely at valve 10 and fills the extended cylinder 8. When released, the elastic cords 9 instantly begin to contract the cylinder 8, while valve 10, closing upon its seat, prevents the escape of the air, so that between the tension of the cords and the resistance of the air an air-pressure is at once established in cylinder 8. The air being forced by the tension of the cords through the orifice 6 into the air-chamber presses the diaphragm $a^3$ against the teat, the elastic zone whereof expands entirely around the teat, to effectually prevent the entrance of any air into the teat-cover, so that the vacuum thereafter to be established in lower chamber, A, may remain intact. The non-elastic zone and splints 5 of diaphragm $a^3$ are forced against the teat by this same air-pressure, so as to hold the teat-cover in place. It will be noted that the vacuum has nothing whatever to do with the expansion of the diaphragm $a^3$ about the teat, or with the suspension of the teat-cover, for at this stage of the operation the vacuum does not and cannot exist. Each and every teat-cover is suspended in the same way, as before described, by air-pressure, and not until every teat-cover in an entire section is thus suspended is a vacuum for that section possible. The operation of adjusting the teat-covers in place is quickly and easily accomplished. When all the covers of an entire section are adjusted to place, the exhaust may be effected and the milking can commence. The vacuum developed in lower chamber, A, inflates the diaphragm $a^3$, and causes the flexible zone thereof to closely embrace the teat, effectually excluding any ingress of air from about rim $a^2$ below into chamber A, so that the vacuum established in said lower chamber remains intact, and the teat-covers are easily sustained in place by the outside pressure thereon.

The stiffness of the lower part of the diaphragm $a^3$, supported, as said part is, by vertical splints 5, keeps the flexible zone well in place, so that it cannot be forced inward, but clings closely to the teat, to maintain an air-tight joint. At the same time it will be understood that the splints and non-elastic zone of the diaphragm press against the teat and form an air-tight wall between the elastic zone and the vacuum-chamber. The suction of the vacuum causes the splints to press against the sides of the teat the more firmly, and makes it impossible for either part of the diaphragm to be dragged down. The splints allow the teat the utmost freedom of action, accompanying it with an undulatory motion as it responds to the suction, and returning with it when released on the destruction of the vacuum at the pump. The amount of air inclosed in the pressure-case will not allow said case to close, so that the strands 9 keep the pressure up from beginning to end of the milking, the diaphragm swelling as the teat shrinks. The pressure is gentle, light, constant, and evenly distributed, securing perfect air-tightness without impeding the flow of milk in the slightest degree. The teat, in responding to the suction of the vacuum, causes a counteraction in the teat-cover, which by its rim $a^2$ presses against the udder at the head of the teat the same instant that a vacuum is formed at the outlet. The action of a calf's mouth and throat in sucking is evidently closely followed throughout. When the milking is finished, if the button on the tongue of the valve 10 be pressed, the confined air in the pressure-case escapes, and the strands 9 and diaphragm resume their natural position, allowing the teat-cover to drop off.

It is obvious that body $b$ and thimble $b'$ of the pressure-case may be dispensed with, still retaining the cylinder 8, strands 9, and valve 10 as means for effecting the desired expansion of diaphragm $a^3$ about the teat. It is also plain that other forms of exhaust device may be used to produce the necessary vacuum in the milking appliances. These and other like modifications may be made without departing from the spirit of my invention, which is not limited to precise details herein set forth.

Having thus described my invention, what I claim as new, and desire to secure by Letters Patent, is—

1. The combination, with the individual sets of teat-covers and the accumulating-bulbs therefor, of the exhaust mechanism and the intermediate tubing, the said tubing being provided with collecting-bulbs to receive the contents of the several accumulating-bulbs, substantially as described.

2. The combination, with the teat-covers and their tubing, of exhaust mechanism, constructed substantially as described, having automatically a quick suction movement and a comparatively long delay or rest, to allow for accumulation of milk in the conduits, substantially as described.

3. The combination, with the several individual sets of teat-covers and their tubing, of exhaust mechanism, constructed substantially as described, having automatically a quick suction movement and a comparatively long delay or rest, to allow for accumulation of milk in the conduits, substantially as described.

4. The combination, with the individual sets of teat-covers, of the single exhaust mechanism and the intermediate tubing which connects said sets of covers with the exhaust mechanism, said tubing in relation to each set of covers and the exhaust mechanism being of substantially equal length or capacity, substantially as set forth.

5. The combination, with the individual sets of teat-covers, of the single exhaust mechanism and the intermediate tubing which connects said sets of covers with the exhaust mechanism and serves as a conduit for the milk, said tubing in relation to each set of covers and the exhaust mechanism being of substantially equal length or capacity, substantially as described.

6. The combination, with the teat-covers and their tubing, of an exhaust-pump connected therewith, a driving-wheel to operate said pump, a main drive-wheel, and means, substantially as described, which impart to the pump-driving wheel an intermittent movement, substantially as set forth.

7. The combination, with the exhaust-pump cylinder and with the pipe $c^2$, which joins to the tubing of the teat-covers, of the pipe $c'$, inclosing said pipe $c^2$, and the reciprocating piston-head $c$, substantially as described.

8. In a cow-milking apparatus, the combination, with the drive-wheel D, having raised rim $d'$ thereon, and with the pump-driving wheel $d$, bearing against said rim, to be revolved thereby, of suitable lock mechanism to hold said wheel immovably in place during part rotation of the main drive-wheel, and the exhaust-pump C, which communicates with the teat-cover conduits, substantially as described.

9. The combination, with main drive-wheel D, having raised rim $d'$ and projecting lug $d^4$ thereon, of the pump-driving wheel $d$, bearing upon said rim and having notch $d^3$, the spring-catch $d^2$, the reciprocating pump having pipes $c'$ $c^2$, and the tubing to connect the same with the teat-covers, substantially as described.

10. A teat-cover having an expansible air-chamber to encompass the teat, and a pressure-case communicating with said air-chamber, substantially as described.

11. The combination, with the teat-cover having an expansible air-chamber, of a collapsible pressure-case communicating with said air-chamber, substantially as described.

12. The combination, with the teat-cover casing and with the diaphragm connected thereto, to form a closed air-chamber, of the pressure-case communicating with the air-chamber, said case consisting of a flexible cylinder, 8, provided with valve 10, and suitable contractile means to collapse said cylinder, substantially as described.

13. The combination, with the teat-cover and the expansible air-chamber encompassing the teat, of the collapsible pressure-case having valve therein, and suitable means tending to close said case together, substantially as described.

14. The combination, with the teat-cover casing, of the pressure-case consisting of the body $b$, thimble $b'$, having valve therein, the cylinder 8, and contractible cords 9, substantially as described.

15. The combination, with the teat-cover casing having rim $a^2$, of the diaphragm $a^3$, having stay-splints 5, substantially as described.

16. The combination, with the casing of the teat-cover, of the diaphragm secured thereto, the stiffening-splints 5, and the pressure-case coacting to expand the diaphragm, substantially as described.

In testimony whereof I have hereunto set my hand this 13th day of June, A. D. 1883.

JAMES P. MARTIN.

In presence of—
  JOSEPH RATHWELL,
  ALEXANDER ADAMS.